(12) United States Patent
Nelson et al.

(10) Patent No.: US 12,487,962 B2
(45) Date of Patent: Dec. 2, 2025

(54) OFFLOADING COMPUTE PROCESSING TO AN INPUT/OUTPUT (I/O) DEVICE CONNECTED OVER A USB TYPE-C CONNECTOR

(71) Applicant: Intel Corporation, Santa Clara, CA (US)

(72) Inventors: Aruni Nelson, Folsom, CA (US); Abdul Ismail, Beaverton, OR (US); Ashok Mishra, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 683 days.

(21) Appl. No.: 17/748,377

(22) Filed: May 19, 2022

(65) Prior Publication Data

US 2022/0276981 A1    Sep. 1, 2022

(51) Int. Cl.
*G06F 13/42* (2006.01)
(52) U.S. Cl.
CPC .. *G06F 13/4282* (2013.01); *G06F 2213/0042* (2013.01)
(58) Field of Classification Search
None
See application file for complete search history.

(56) References Cited

U.S. PATENT DOCUMENTS

| | | | |
|---|---|---|---|
| 2013/0142189 A1* | 6/2013 | Seok | H04W 76/12 370/338 |
| 2021/0055777 A1* | 2/2021 | Regupathy | G06F 9/30101 |

* cited by examiner

*Primary Examiner* — Henry Tsai
*Assistant Examiner* — Dean Phan
(74) *Attorney, Agent, or Firm* — Schwegman Lundberg & Woessner, P.A.

(57) ABSTRACT

A USB4 host system for offloading compute processing includes a host processor and a first routing circuit communicatively coupled to the host processor via an interface adapter. The first routing circuit is to decode device capability information received via a USB Type-C communication link from a second routing circuit. The device capability information indicates the second routing circuit is configured for offload processing. A downstream tunneled path is configured between the host processor and the second routing circuit based on the device capability information. The downstream tunneled path includes the USB Type-C communication link. One or more acceleration commands and operands/data from the host processor are packetized into a first plurality of USB4 tunneled packets. The first plurality of USB4 tunneled packets is encoded for transmission to the second routing circuit via the downstream tunneled path, to initiate the offload processing of the operands/data by the second routing circuit.

20 Claims, 5 Drawing Sheets

FIG. 5 though the USB4 specification is associated with fast data transfers, current USB4 devices have limited capabilities for offloading compute processing.

OFFLOADING COMPUTE PROCESSING TO AN INPUT/OUTPUT (I/O) DEVICE CONNECTED OVER A USB TYPE-C CONNECTOR

TECHNICAL FIELD

Aspects pertain to wired communications between electronic devices. Some aspects relate to offloading compute processing based on transferring data over a Universal Serial Bus (USB) connector such as a USB Type-C connector.

BACKGROUND

The Universal Serial Bus (USB) is an interface standard originally intended for connection, communication, and power supply between host devices (e.g., a laptop, a personal computer, a display, an external storage device, or other types of peripheral devices including USB hubs) for plug-and-play capability. The USB protocol has been extended to industrial applications and as a way to charge mobile devices. The USB protocol is characterized by three generations of USB specifications, namely, USB 1.x, USB 2.0, and USB 3.x. The fourth generation of a USB specification (USB4) has been developed based on the Thunderbolt® 3 protocol specification. Even though the USB4 specification is associated with fast data transfers, current USB4 devices have limited capabilities for offloading compute processing.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

The following description and the drawings sufficiently illustrate aspects to enable those skilled in the art to practice them. Other aspects may incorporate structural, logical, electrical, process, and other changes. Portions and features of some aspects may be included in or substituted for, those of other aspects. Aspects outlined in the claims encompass all available equivalents of those claims.

USB4 communication solutions build upon USB2 and USB3 solutions as well as Intel's Thunderbolt® technology. USB4 technology allows for data exchange between a USB4 host and a USB4 device over a USB Type-C connector using a USB Type-C cable. In some aspects, USB4 devices can have limited offloading capabilities. For example, USB4 devices can be limited to tunneling I/O transfers without the ability to offload host processing or host-managed device memory.

Additionally, existing USB4 applications may be challenging to scale in connection with offloading compute and XPU processing at the endpoints which are not Peripheral Component Interconnect Express (PCIe) endpoints. More specifically, USB4 solutions can also allow limited offload over PCIe (for example an external graphics card), which solutions are not generic and are limited to PCIe endpoints (associated with high pin count PCIe connectors) or proprietary interconnects. In this regard, existing USB4 solutions can be challenging to improve as such solutions do not scale to compute offloading and acceleration capabilities to generic endpoints, other than PCIe endpoints such as a USB device connected as an endpoint.

The disclosed techniques can include offloading (e.g., accelerating) computing to other endpoints and devices, such as USB devices, over a USB Type-C connector. More specifically, the disclosed techniques use the capabilities, current bandwidth, and future increase in bandwidth of USB4, to offload compute processing/acceleration to USB4 device over an I/O connector (e.g., a USB Type-C connector). More specifically and as discussed in connection with FIGS. 1-4, the disclosed techniques include the following circuitry and associated functionalities: a downstream accelerator adapter in the USB4 host router, an upstream accelerator adapter in the USB4 device router, an adapter configuration space in downstream and upstream accelerator adapters (with details on capabilities of the upstream accelerator adapter such as the memory availability and host vs. device-managed memory), an accelerator function (e.g., an accelerator circuit) with acceleration processing logic and optional acceleration memory (e.g., host-managed or device-managed memory in the USB4 devices), a hardware (HW) or software (SW) logic in the USB4 host router to enumerate as an accelerator device over a PCIe interface or other custom internal fabric, and use USB4 tunneled packet types to configure the accelerator device and carry accelerator commands, operands/data, and results.

The disclosed techniques associated with offloading compute processing to an I/O device connected over a USB Type-C connector can result in the following processing improvements in comparison with existing USB4 devices: system-on-a-chip (SoC) die size reduction due to the ability to move some accelerators out of the SOC; utilization of the host's internal implementation of fabric, bandwidth, and mechanism for offloading compute and acceleration to external accelerators connected over standardized I/O connectors (e.g., USB Type-C connectors); flexibility in selecting accelerators; utilization of increased USB4 I/O bandwidth for offloading compute processing; scaling USB4 capabilities to offload compute and XPU processing at the I/O endpoints (the importance of this scaling can increase with future increases in USB bandwidth); the ability for the host system to manage device memory; scalable and versatile platform architecture; increased power savings of SoC; and improved battery life.

As used herein, the term "operands/data" refers to one or both of command operands (e.g., acceleration command operands) and data (e.g., data which can be processed using the operands).

Figure 1:
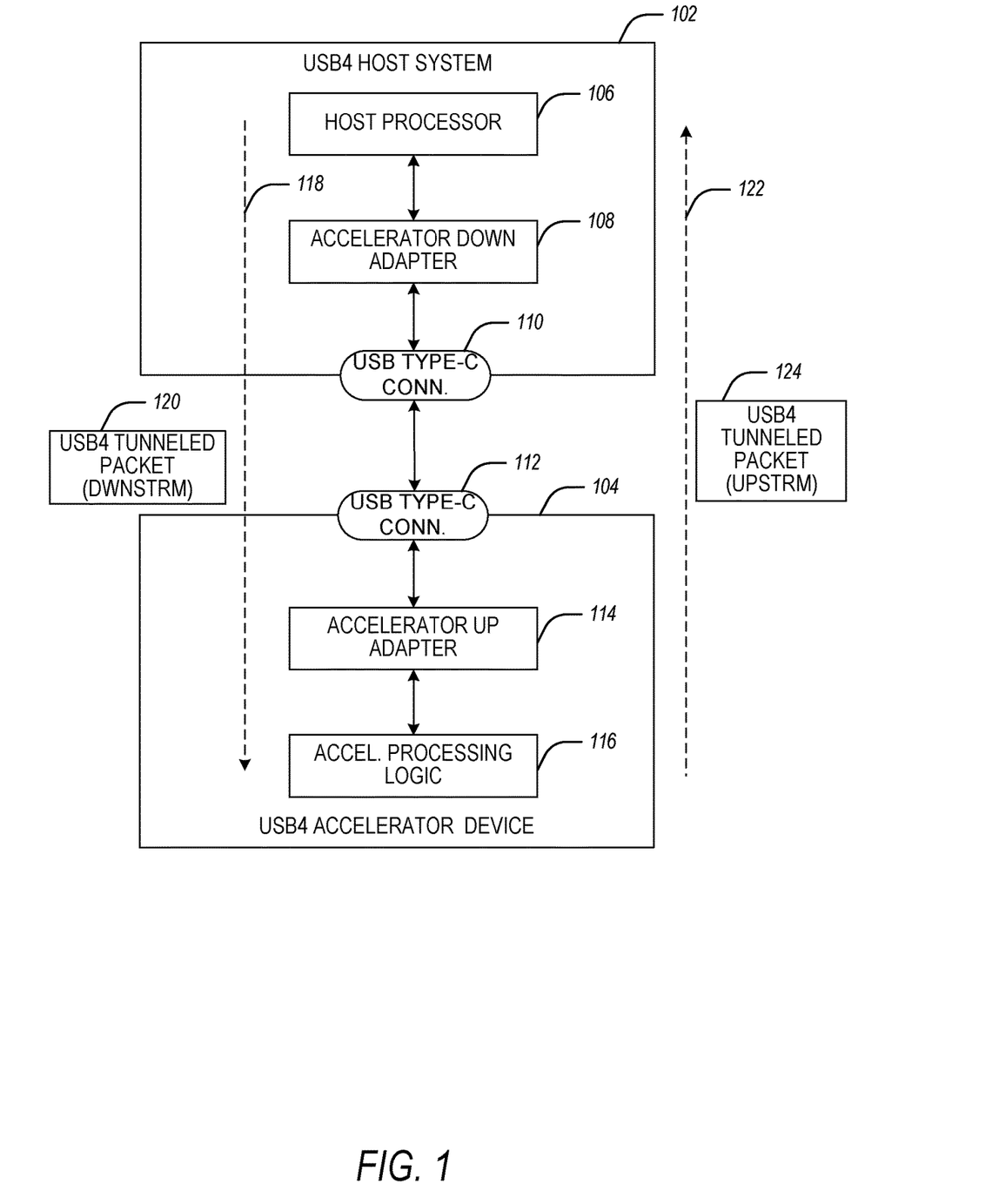
FIG. 1 illustrates a block diagram of a USB4 host system and a USB4 accelerator device configured for offloaded processing, in accordance with some aspects.
Figure 2:
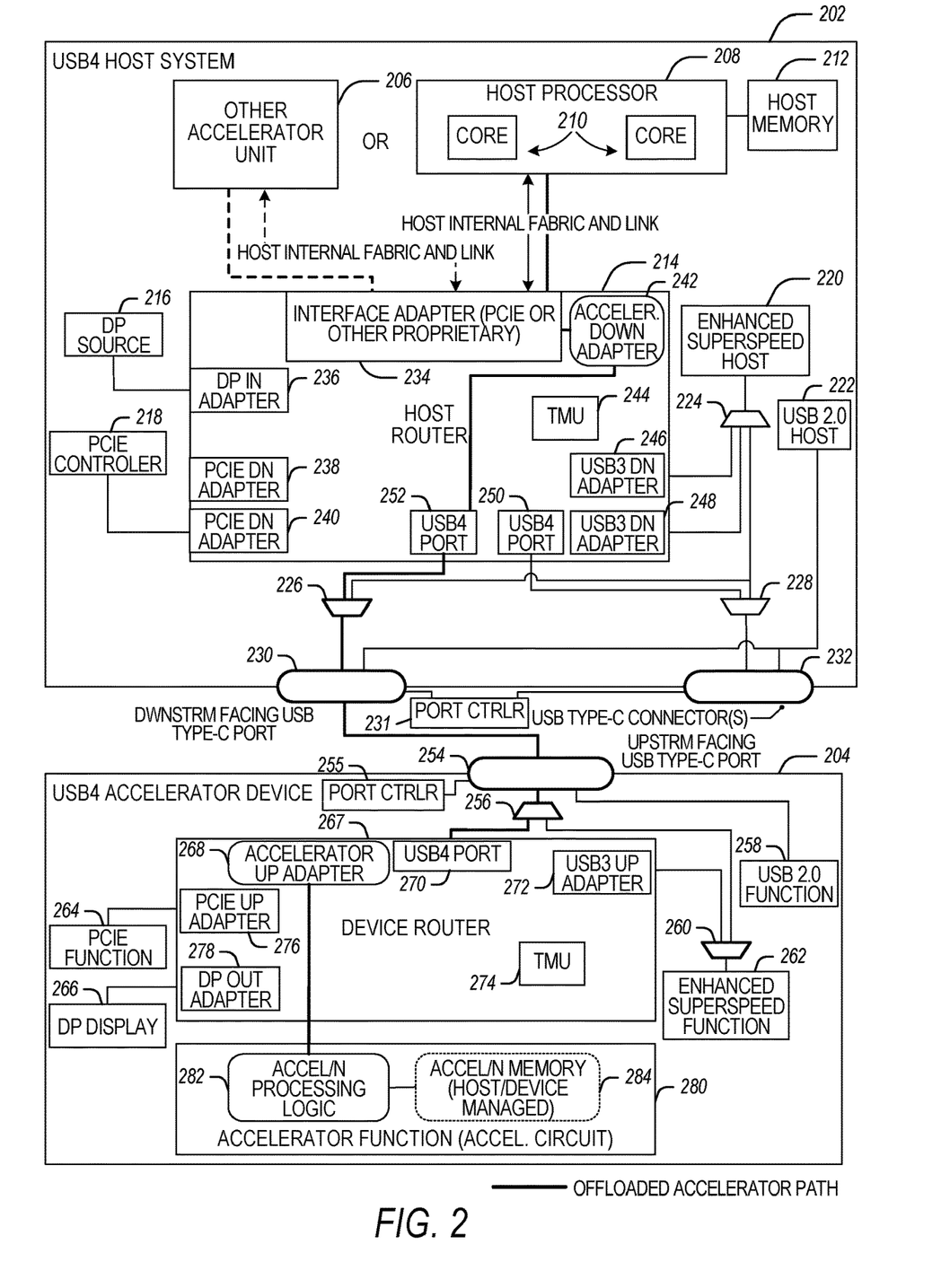
FIG. 2 illustrates a more detailed block diagram of a USB4 host system and a USB4 accelerator device configured for offloaded processing, in accordance with some aspects.
Figure 3:
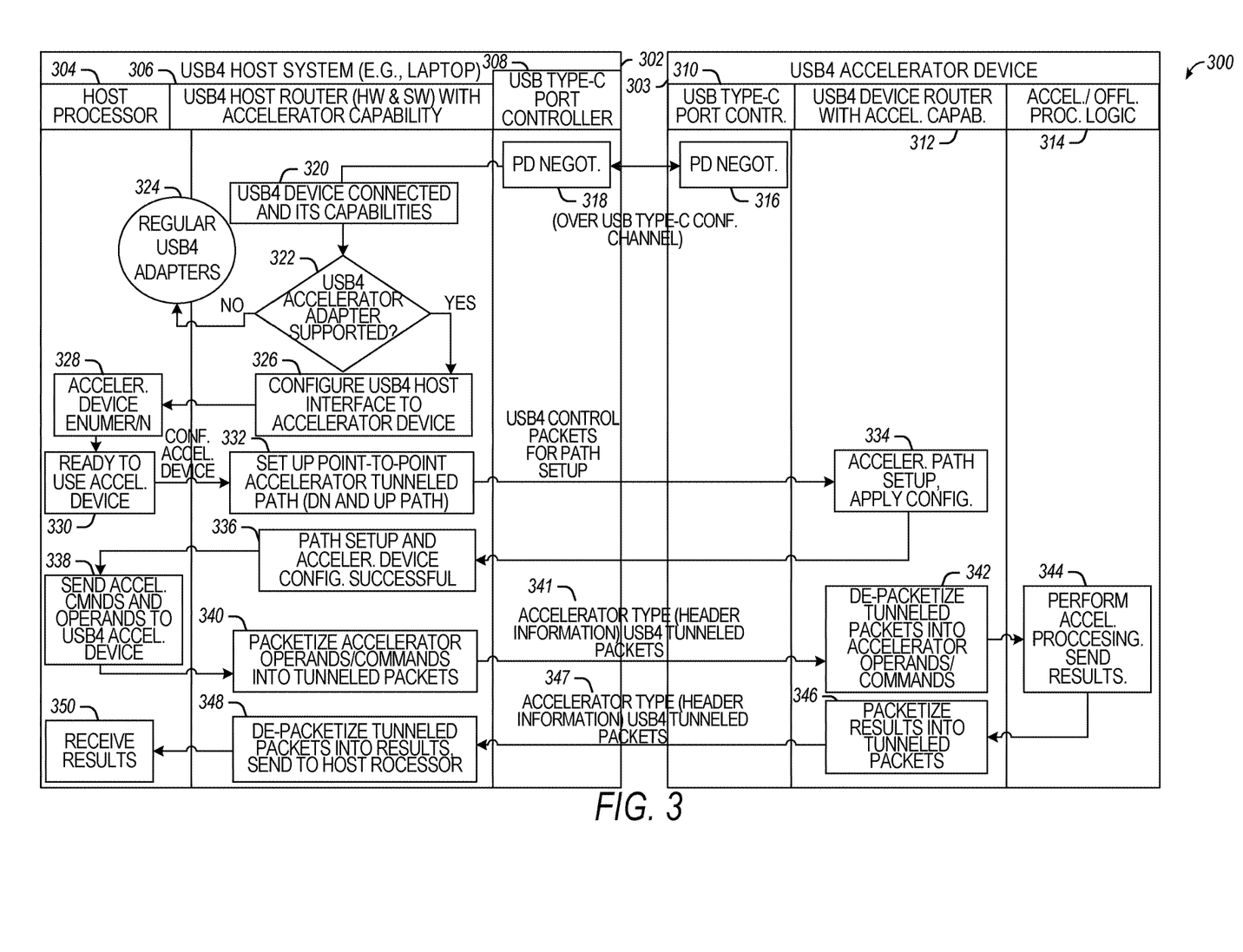
FIG. 3 is a swimlane diagram illustrating an example processing flow for offloading acceleration processing from a USB4 host processor to a USB4 accelerator device, in accordance with some aspects.
Figure 4:
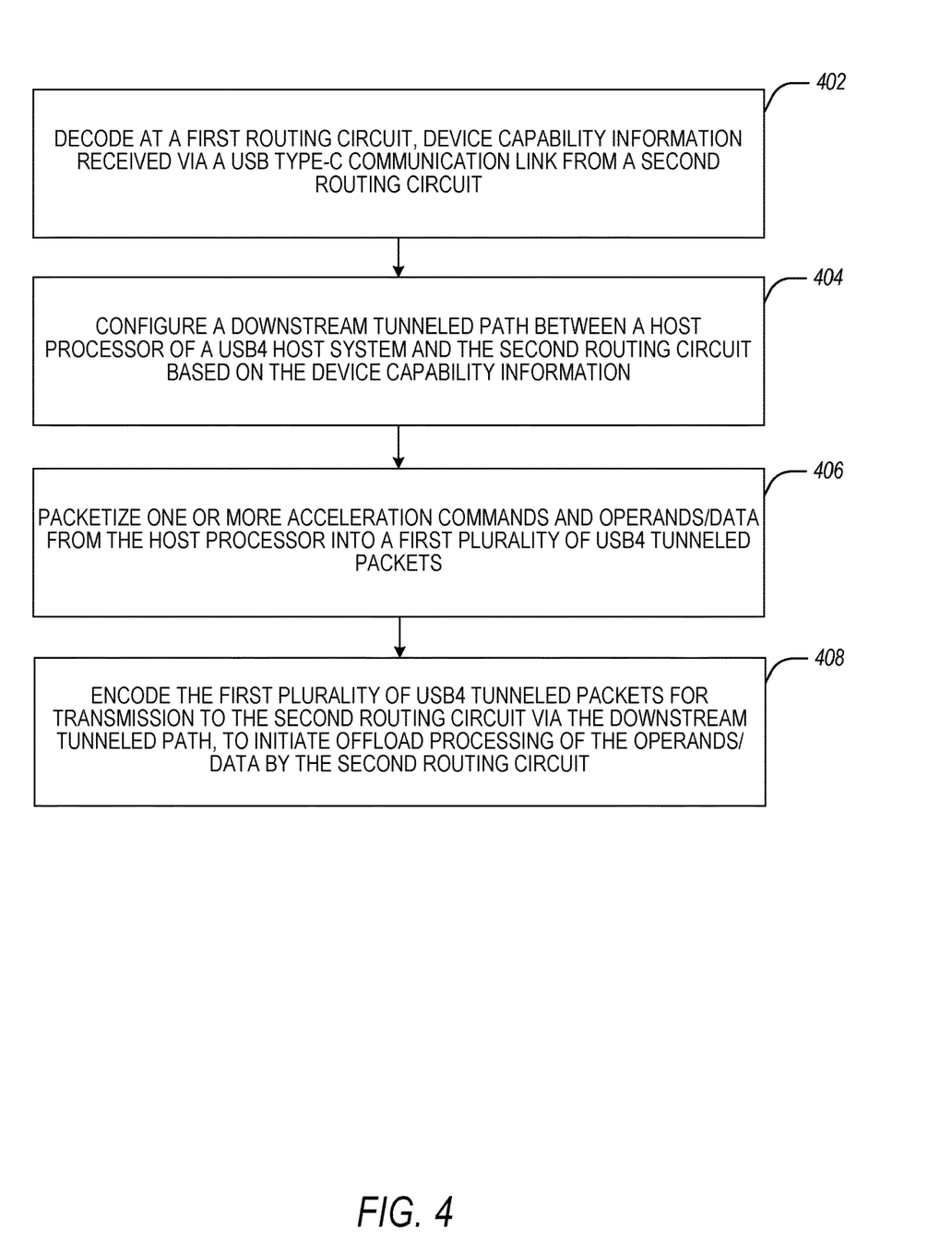
FIG. 4 is a flow diagram of a method of offloading compute processing over a USB Type-C connector, in accordance with some aspects.
Figure 5:
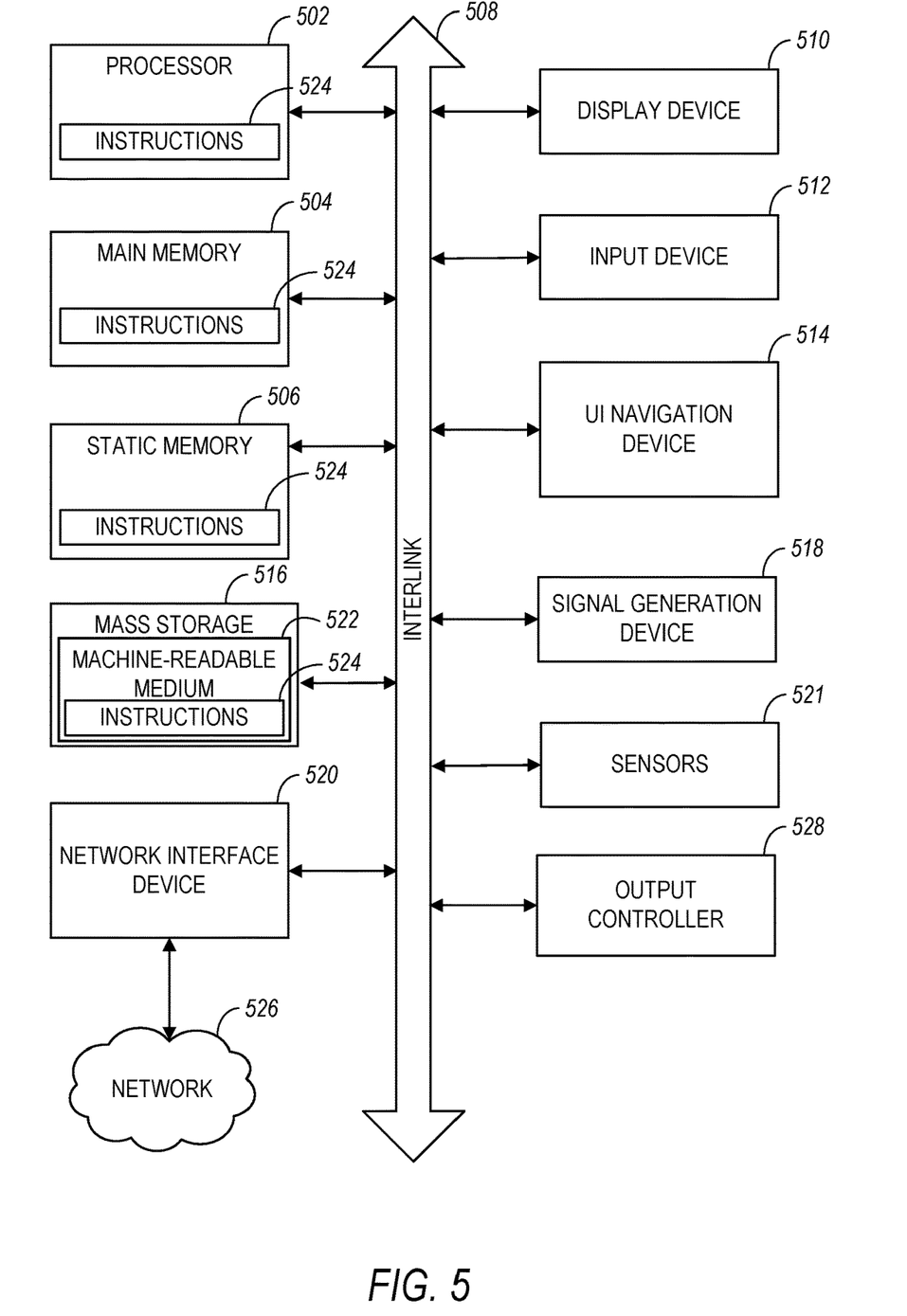
FIG. 5 is a block diagram illustrating an example of a machine upon which one or more embodiments may be implemented.

Example USB4 host system and USB4 accelerator device performing the disclosed functionalities are discussed in greater detail in FIG. 1 and FIG. 2. FIG. 3 and FIG. 4 provide example methods for offloading compute processing to an I/O device connected over a USB Type-C connector. FIG. 5 is an example machine upon which any one or more of the disclosed techniques may be performed.

FIG. 1 illustrates a block diagram of a USB4 host system 102 and a USB4 accelerator device 104 configured for offloaded processing, in accordance with some aspects. Referring to FIG. 1, the USB4 host system 102 includes a host processor 106, an downstream accelerator adapter 108 (also referred to as a downstream accelerator adapter), and an I/O connector such as a USB Type-C connector 110. The USB4 accelerator device 104 includes an upstream accelerator adapter 114 (also referred to as an upstream accelerator adapter), accelerator processing logic 116, and an I/O connector such as a USB Type-C connector 112.

The USB4 host system 102 and the USB4 accelerator device 104 can be communicatively coupled via the USB Type-C connectors 110 and 112 for offloading compute processing (e.g., acceleration) from the USB4 host system 102 to the USB4 accelerator device 104. After the USB4 accelerator device 104 is connected to the USB4 host system 102 via the USB Type-C connectors 110 and 112, the USB4 host system 102 detects the accelerator capabilities of USB4 accelerator device 104 (e.g., based on a detected presence of the acceleration processing logic 116). The USB4 host system 102 then establishes point-to-point tunneled paths between the USB4 host system 102 and the USB4 accelerator device 104. For example, the USB4 host system 102 establishes a downstream tunneled path 118 and an upstream tunneled path 122. The host processor 106 can communicate one or more acceleration commands and operands/data to the downstream accelerator adapter 108 for packetization into at least one USB4 (downstream) tunneled packet 120. At least one USB4 tunneled packet 120 is communicated to the USB4 accelerator device 104 via the downstream tunneled path 118.

At the USB4 accelerator device 104, the upstream accelerator adapter 114 de-packetizes the received at least one USB4 tunneled packet 120 and communicates the obtained commands and operands/data to the acceleration processing logic 116. The acceleration processing logic 116 performs offload processing (e.g., acceleration) to obtain result data. The result data is packetized by the upstream accelerator adapter 114 into at least one USB4 (upstream) tunneled packet 124, which is communicated back to the USB4 host system 102 via the upstream tunneled path 122. The downstream accelerator adapter 108 de-packetizes the at least one USB4 tunneled packet 124 to obtain the result data and communicates the result data to the host processor 106. A more detailed description of the USB host system 102 and the USB4 accelerator device 104 as well as techniques for offloading compute processing between such devices is provided below in connection with FIGS. 2-4.

The functionalities associated with offloading compute processing as discussed in connection with FIGS. 2-4 are associated with the following features:

(a) Hardware, firmware, or a combination of hardware and firmware logic in the host interface adapter (e.g., interface adapter 234) of the USB4 host router allows detection and enumeration of host router topology over PCIe (or another interface) in the silicon for accelerator functionalities supported in the silicon-based on the accelerator adapter availability (e.g., availability of the accelerator function 280) in the USB4 device (e.g., USB4 accelerator device 204).

(b) Downstream accelerator adapter 242 and an upstream accelerator adapter 268 for transmitting and receiving accelerator type USB4 tunneled packets.

(c) Adapter configuration space with attributes to determine if a device supports accelerator capabilities, type of acceleration/processing support, availability of memory in the USB4 device, and configuring the accelerator parameters such as host or device-managed USB4 device memory.

(d) Accelerator/offloaded processing logic (e.g., acceleration processing logic 282) and acceleration memory (e.g., acceleration memory 284) (host or device managed) in the USB4 device.

(e) A new type of packet can be used for offloading the compute processing, such as a USB4 tunneled packet type (e.g., accelerator tunneled packets with USB4 headers describing accelerator type tunneled packet and payload such as acceleration commands, operands/data, and/or results).

(f) The disclosed offloading functionalities can include USB4-related operations to configure the accelerator parameters (e.g., to use host or device managed USB4 device memory), configure the acceleration mode based on the types of acceleration supported, and support a use case with host-managed I/O device memory (e.g., acceleration memory 284 managed by the host processor 208).

FIG. 2 illustrates a more detailed block diagram of a USB4 host system 202 and a USB4 accelerator device 204 configured for offloaded processing, in accordance with some aspects. The USB4 host system 202 and the USB4 accelerator device 204 can be similar to the USB4 host system 102 and the USB4 accelerator device 104 of FIG. 1. Referring to FIG. 2, the USB4 host system 202 can include a host processor 208, a host router 214, a display port (DP) source 216, a PCIe controller 218, an enhanced superspeed host 220, a USB 2.0 host 222, multiplexers 226 and 228, USB Type-C connectors 230 and 232, and a port controller 231 (associated with both USB Type-C connectors 230 and 232). The host processor 208 can include processing cores 210 and can be coupled to host memory 212. In some aspects, the USB4 host can further include an accelerator unit 206, which can be configured (e.g., instead of or in addition to the host processor 208) to utilize the offload capabilities offered by the USB4 accelerator device connected to the USB4 host system 202.

The host router 214 can include an interface adapter 234 (e.g., for interfacing with the host processor 208), an downstream accelerator adapter 242, USB4 ports 250 and 252 (associated with corresponding USB Type-C connectors 232 and 230), USB3 down adapters 246 and 248, a DP input adapter 236, PCIe down adapters 238 and 240, and a time management unit (TMU) 244.

The USB4 accelerator device 204 can include a USB Type-C connector 254, multiplexers 256 and 260, a device router 267, an accelerator function 280 (which can also be configured as an accelerator circuit 280), a PCIe function 264 (which can be configured as a PCIe circuit), a DP display 266, a USB 2.0 function 258 (which can be configured as a USB 2.0 circuit), a port controller 255 (associated with USB Type-C connector 254), and an enhanced superspeed function 262 (which can be configured as an enhanced superspeed circuit associated with USB 3.0 data traffic processing).

The device router 267 can include an upstream accelerator adapter 268, a USB4 port 270, a USB3 up adapter 272, a TMU 274, a PCIe up adapter 276, and a DP out adapter 278. The accelerator function 280 can include an acceleration processing logic 282 and, optionally, acceleration memory 284 (which can be host and/or device managed).

As illustrated in FIG. 2, the USB4 host system 202 and the USB4 accelerator device 204 have protocol-specific adapters (e.g., DP, PCIe, and USB3-based adapters) which perform the packetizing of native data into USB4-specific tunneled packets and depacketizing of such packets. More specifically, the corresponding adapters (e.g., DP input adapter 236, PCIe down adapters 238 and 240, and USB3 down adapters 246 and 248) in the host router 214 of the USB4 host system can receive corresponding native display data (e.g., DP data from DP source 216), PCIe data (e.g., from PCIe controller 218), and native USB data (e.g., USB3 data received from the enhanced superspeed host 220 via multiplexer 224), and can wrap/packetize the data into USB4-specific tunneled packets (e.g., the at least one USB4 tunneled packet 120 in FIG. 1). The USB4 tunneled packets are communicated to the USB4 accelerator device 204 via a USB Type-C communication link (e.g., the communication link between USB Type-C connectors 230 and 254). Corresponding adapters (e.g., 278, 276, and 272) in the device router 267 receive the USB4 tunneled packets, and depacketize the packets to obtain native display, PCIe, and USB3 data, which is sent to the corresponding endpoints or functions (e.g., DP display 266, PCIe function 264, and enhanced superspeed function 262) for display or processing. In some embodiments, the USB4 accelerator device 204 can be configured without DP, PCIe, or USB3 adapters.

USB2 data can be communicated from the USB 2.0 host 222 to the USB 2.0 function 258 directly (via the USB Type-C connectors 230 and 254), without USB4 packetization and de-packetization.

Even though FIG. 2 illustrates two PCIe and USB3 adapters in the USB4 host system 202, the disclosure is not limited in this regard and a different number of such adapters can be used (e.g., as many adapters as there are output ports).

The TMUs 244 and 274 are configured to provide time management and synchronization for sending, receiving, and processing of data by the USB4 host system 202 and the USB4 accelerator device 204.

In some aspects, the adapters used by the USB4 host system 202 and the USB4 accelerator device 204 are protocol-specific and can be configured based on configurations associated with the corresponding protocol.

In some embodiments, an offload processing (e.g., acceleration) end-to-end path can be formed (e.g., as illustrated by the bolded communication path in FIG. 2) between the host processor 208, host router 214 (including interface adapter 234, downstream accelerator adapter 242, and USB4 port 252), USB Type-C connectors 230 and 254, device router 267 (e.g., USB4 port 270 and downstream accelerator adapter 268), and accelerator function 280 (e.g., acceleration processing logic 282 of the accelerator function 280). Such offload processing path can include downstream and upstream tunneled paths (e.g., downstream tunneled path 118 and an upstream tunneled path 122 in FIG. 1). The downstream accelerator adapter 242 and the upstream accelerator adapter 268 can perform USB4 packetization and de-packetization functions (e.g., functions similar to the downstream accelerator adapter 108 and the upstream accelerator adapter 114 of FIG. 1). In some embodiments, USB4 packetization includes wrapping native data and/or commands (e.g., acceleration commands including operands) with a USB4 header to form one or more USB4 tunneled packets.

Communication of USB4 tunneled packets between the USB4 host system 202 and the USB4 accelerator device 204 is performed via corresponding USB4 ports 252 and 270. The USB4 ports 252 and 270 are associated with corresponding USB Type-C connectors 230 and 254 and are used for managing USB4-related communications (e.g., bandwidth, timing, traffic prioritization, etc.). Port controllers 231 and 255 are configured to monitor communication channels (or pins) of the corresponding USB Type-C connectors 230 and 254. In some aspects, port controllers 231 and 255 are configured to perform other protocol-specific procedures, including power delivery (PD) negotiation or other procedures.

In some embodiments, the adapters illustrated in FIG. 2 can be configured to include configurations that can indicate if the corresponding adapter supports acceleration capabilities via USB4 packetization and de-packetization.

In some aspects, the acceleration memory 284 is optional and can be used to store acceleration results (e.g., result data generated by the acceleration processing logic 282) for the host processor 208 to access directly (e.g., via the configured end-to-end path) or for the device router 267 to access and retrieve for communication back to the USB4 host system 202. A more detailed description of example processing flows for offloading acceleration processing is provided below in reference to FIG. 3 and FIG. 4.

FIG. 3 is a swimlane diagram 300 illustrating an example processing flow for offloading acceleration processing from a USB4 host processor 304 of a USB4 host system 302 to a USB4 accelerator device 303, in accordance with some aspects. The USB4 host system 302 (with a USB host processor 304, host router 306, and port controller 308) can be the same as the USB4 host system 202 (with a USB host processor 208, host router 214, and port controller 231). Similarly, the USB4 accelerator device 303 (with a port controller 310, device router 312, and acceleration processing logic 314) can be the same as the USB4 accelerator device 204 (with a port controller 255, device router 267, and acceleration processing logic 282).

Referring to FIG. 2 and FIG. 3, when USB4 accelerator device 204 is attached to the USB4 host system 202 via USB Type-C connectors 230 and 254, power delivery (PD) negotiations (e.g., during operations 316 and 318) take place between the corresponding port controllers 231 and 255 (e.g., over a USB Type-C communication link formed between USB Type-C connectors 230 and 254.

At operation 320, the host router 214 detects that the USB4 accelerator device 204 is connected, and it also detects the connected device's capabilities. For example, device capability information of USB4 accelerator device 204 (e.g., availability of accelerator function 280) is communicated to the host router 214. At operation 322, the host router 214 determines whether device 204 supports (e.g., includes) a USB4 accelerator adapter. If no accelerator adapter is supported by device 204, processing continues at operation 324, when other processing adapters may be used. If device 204 supports a USB4 accelerator adapter, processing continues at operation 326, when the host and device router topology (e.g., the topology of the host router 214 and the device router 267) is configured as an accelerator device via the interface adapter 234.

At operation 328, the host processor 208 performs enumeration of the host and device router topology via the interface adapter 234 as an accelerator device (e.g., reserves processing resources, communication bandwidth, memory, etc.). At operation 330, the host processor 208 is configured to use the host and device router topology via the interface adapter 234 as an accelerator device in connection with offloading compute processing to device 204. At operation 332, host router 214 sets up a point-to-point accelerator tunneled path (e.g., a downstream tunneled path 118 and an upstream tunneled path 122). At operation 334, the tunneled path configurations are also communicated to device router 267 of the USB4 accelerator device 204 to complete the end-to-end setup of the downstream/upstream tunneled path. An acknowledgment of the tunneled path setup completion can be communicated back to the host router 214.

At operation 336, host router 214 communicates an acknowledgment that the tunneled path set up at the host system and accelerator device sides is completed successfully. At operation 338, the host processor 208 sends acceleration commands and operands/data to the host router 214 for offloading to the USB4 accelerator device 204. At operation 340, host router 214 packetizes the operands and data into one or more USB4 tunneled packets 341, which are communicated via the established tunneled path to the device router 267. At operation 342, device router 267 de-packetizes the USB4 tunneled packets 341 to obtain acceleration commands and operands/data which are communicated to the acceleration processing logic 282. At operation 344, the acceleration processing logic 282 performs acceleration processing (e.g., using the acceleration commands and operands/data received from the device router 267) to obtain result data.

The result data is communicated back to the device router 267. At operation 346, the device router (e.g., the upstream accelerator adapter 268) packetizes the result data into USB4 tunneled packets 347, which are communicated via the established path (e.g., upstream tunneled path 122) to the host router 214. At operation 348, host router 214 (e.g., the downstream accelerator adapter 242) de-packetizes the USB4 tunneled packets 347 to obtain the result data. AT operation 350, the host processor 208 receives the result data from the host router 214 via the interface adapter 234.

FIG. 4 is a flow diagram of a method 400 of offloading compute processing over a USB Type-C connector, in accordance with some aspects. Referring to FIGS. 1-4, at operation 402 (which can include operations 316, 318, 320, 322, 326, 328, and 330), device capability information received via a USB Type-C communication link (e.g., a communication link between USB Type-C connectors 230 and 254) from a second routing circuit (e.g., device router 267) is decoded by a first routing circuit (e.g., host router 214) of a USB4 host system (e.g., USB4 host system 202). The device capability information indicates the second routing circuit is configured for offload processing. For example, the device capability information can indicate the presence of the accelerator function 280 (including acceleration processing logic 282 and acceleration memory 284) in the USB4 accelerator device 204.

At operation 404 (which can include operations 332, 334, and 336), a downstream tunneled path (e.g., downstream tunneled path 118) is configured between a host processor (e.g., host processor 208) of the USB4 host system (e.g., USB4 host system 202) and the second routing circuit (e.g., device router 267) based on the device capability information. The downstream tunneled path includes the USB Type-C communication link associated with the USB Type-C connectors 230 and 254.

At operation 406 (which can include operations 338 and 340), one or more acceleration commands and operands/data from the host processor are packetized into a first plurality of USB4 tunneled packets (e.g., USB4 tunneled packets 341).

At operation 408 (which can include operations 340 and 341), the first plurality of USB4 tunneled packets are encoded for transmission to the second routing circuit (e.g., device router 267) via the downstream tunneled path, to initiate the offload processing of the data by the second routing circuit (which can include operations 342 and 344).

In some embodiments, an upstream tunneled path (e.g., upstream tunneled path 122) between the host processor 208 and the second routing circuit (e.g., device router 267) is configured based on the device capability information, the upstream tunneled path including the USB Type-C communication link.

In some embodiments, a second plurality of USB4 tunneled packets (e.g., USB4 tunneled packets 347) is decoded at the host router 214 to obtain result data associated with the offload processing. The second plurality of USB4 tunneled packets is received from the second routing circuit via the upstream tunneled path. The obtained result data is communicated to the host processor 208.

In some aspects, the one or more operands comprise one or more acceleration commands associated with the offload processing. In some aspects, the result data is associated with the application of the one or more acceleration commands to the data during the offload processing. In some aspects, the device capability information indicates the second routing circuit (e.g., device router 267) is configured to access acceleration processing logic (e.g., acceleration processing logic 282) configured to perform the offload processing.

In some embodiments, an interface adapter (e.g., interface adapter 234) of the first routing circuit (e.g., host router 214) is configured to enumerate an accelerator device 204 for the host processor 208, based on the device capability information. In some aspects, the host processor 208 can reserve bandwidth resources for the accelerator device, where the bandwidth resources can be used for the transmission of the first plurality of USB4 tunneled packets via the downstream tunneled path and for the reception of the second plurality of USB4 tunneled packets via the upstream tunneled path.

In some embodiments, the device capability information indicates the second routing circuit (e.g., device router 267) is configured to access acceleration processing logic 282 configured to perform the offload processing. The acceleration processing logic 282 includes acceleration memory 284. The host router 214 and/or the host processor 208 can further manage access to the acceleration memory 284 of the acceleration processing logic using the downstream tunneled path.

FIG. 5 illustrates a block diagram of an example machine 500 upon which any one or more of the techniques (e.g., methodologies) discussed herein may be performed. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in a peer-to-peer (P2P) (or other distributed) network environment. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, input device 512, and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensors. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine-readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine-readable media.

While the machine-readable medium 522 is illustrated as a single medium, the term "machine-readable medium" may include a single medium or multiple media (e.g., a centralized or distributed database, and/or associated caches and servers) configured to store the one or more instructions 524.

The term "machine-readable medium" may include any medium that is capable of storing, encoding, or carrying instructions for execution by the machine 500 and that causes the machine 500 to perform any one or more of the techniques of the present disclosure, or that is capable of storing, encoding or carrying data structures used by or associated with such instructions. Non-limiting machine-readable medium examples may include solid-state memories and optical and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include the following: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of several transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client, or server computer system) or one or more hardware processors may be configured by firmware or software (e.g., instructions, an application portion, or an application) as a module that operates to perform specified operations. In an example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using the software, the general-purpose hardware processor may be configured as respective different modules at different times. The software may accordingly configure a hardware processor, for example, to constitute a particular module at one instance of time and to constitute a different module at a different instance of time.

The term "transmission medium" shall be taken to include any intangible medium that is capable of storing, encoding, or carrying instructions for execution by the machine 500, and includes digital or analog communications signals or another intangible medium to facilitate communication of such software. In this regard, a transmission medium in the context of this disclosure is a device-readable medium.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

Described implementations of the subject matter can include one or more features, alone or in combination as illustrated below by way of examples.

Example 1 is a Universal Serial Bus 4 (USB4) host system for offloading compute processing, the system comprising: a host processor; and a first routing circuit communicatively coupled to the host processor via an interface adapter, wherein the first routing circuit is to: decode device capability information, the device capability information received via a USB Type-C communication link from a second routing circuit, the device capability information indicating the second routing circuit is configured for offload processing; configure a downstream tunneled path between the host processor and the second routing circuit based on the device capability information, the downstream tunneled path including the USB Type-C communication link; packetize one or more acceleration commands and operands/data from the host processor into a first plurality of USB4 tunneled packets; and encode the first plurality of USB4 tunneled packets for transmission to the second routing circuit via the downstream tunneled path, to initiate the offload processing of the operands/data by the second routing circuit.

In Example 2, the subject matter of Example 1 includes subject matter where the first routing circuit is further to: configure an upstream tunneled path between the host processor and the second routing circuit based on the device capability information, the upstream tunneled path including the USB Type-C communication link.

In Example 3, the subject matter of Example 2 includes subject matter where the first routing circuit is further to: decode a second plurality of USB4 tunneled packets to obtain result data associated with the offload processing, the second plurality of USB4 tunneled packets received from the second routing circuit via the upstream tunneled path; and communicate the result data to the host processor.

In Example 4, the subject matter of Example 3 includes subject matter where the result data is associated with application of the one or more acceleration commands to the operands/data during the offload processing.

In Example 5, the subject matter of Examples 3-4 includes subject matter where the device capability information indicates the second routing circuit is configured to access acceleration processing logic configured to perform the offload processing.

In Example 6, the subject matter of Example 5 includes subject matter where the first routing circuit is further to: configure the interface adapter to enumerate as an accelerator device to the host processor, based on the device capability information indicating the second routing circuit is configured to access the acceleration processing logic configured to perform the offload processing.

In Example 7, the subject matter of Example 6 includes subject matter where the host processor is to: reserve bandwidth resources for the accelerator device, the bandwidth resources used for: the transmission of the first plurality of USB4 tunneled packets via the downstream tunneled path; and reception of the second plurality of USB4 tunneled packets via the upstream tunneled path.

In Example 8, the subject matter of Examples 1-7 includes subject matter where the device capability information indicates the second routing circuit is configured to access acceleration processing logic configured to perform the offload processing, wherein the acceleration processing logic includes acceleration memory, and wherein the host processor is to: manage access to the acceleration memory of the acceleration processing logic using the downstream tunneled path.

Example 9 is an accelerator device for offloading compute processing, the device comprising: a Universal Serial Bus (USB) Type-C connector; a first routing circuit communicatively coupled to the USB Type-C connector, the first routing circuit configured to: encode device capability information for transmission via the USB Type-C connector to a second routing circuit of a host system, the device capability information indicating the first routing circuit is configured for offload processing; and de-packetize a first plurality of USB4 tunneled packets to obtain one or more acceleration commands and operands/data originating from a host processor of the host system, the first plurality of USB4 tunneled packets received from the second routing circuit via a downstream tunneled path between the host processor and the first routing circuit, the downstream tunneled path including a USB Type-C communication link of the USB Type-C connector; and an acceleration circuit communicatively coupled to the first routing circuit, the acceleration circuit configured to perform the offload processing using the one or more acceleration commands and operands/data to obtain result data.

In Example 10, the subject matter of Example 9 includes subject matter where the first routing circuit is configured to: encode a second plurality of USB4 tunneled packets with the result data for transmission to the second routing circuit via an upstream tunneled path.

In Example 11, the subject matter of Example 10 includes subject matter where the upstream tunneled path is configured between the host processor and the first routing circuit based on configuration information received from the second routing circuit via the USB Type-C communication link.

In Example 12, the subject matter of Examples 9-11 includes subject matter where the acceleration circuit comprises acceleration processing logic and acceleration memory, wherein the acceleration processing logic is configured to perform the offload processing, and wherein the first routing device provides the host processor with access to the acceleration memory via the downstream tunneled path.

Example 13 is a method for offloading compute processing, the method comprising: decoding by a first routing circuit of a Universal Serial Bus 4 (USB4) host system, device capability information received via a USB Type-C communication link from a second routing circuit, and the device capability information indicating the second routing circuit is configured for offload processing; configuring a downstream tunneled path between a host processor of the USB4 host system and the second routing circuit based on the device capability information, the downstream tunneled path including the USB Type-C communication link; packetizing one or more acceleration commands and operands/data from the host processor into a first plurality of USB4 tunneled packets; and encoding the first plurality of USB4 tunneled packets for transmission to the second routing circuit via the downstream tunneled path, to initiate the offload processing of the operands/data by the second routing circuit.

In Example 14, the subject matter of Example 13 includes, configuring an upstream tunneled path between the host processor and the second routing circuit based on the device capability information, the upstream tunneled path including the USB Type-C communication link.

In Example 15, the subject matter of Example 14 includes, decoding a second plurality of USB4 tunneled packets to obtain result data associated with the offload processing, the second plurality of USB4 tunneled packets received from the second routing circuit via the upstream tunneled path; and communicating the result data to the host processor.

In Example 16, the subject matter of Example 15 includes subject matter where the result data is associated with application of the one or more acceleration commands to the operands/data during the offload processing.

In Example 17, the subject matter of Examples 15-16 includes subject matter where the device capability information indicates the second routing circuit is configured to access acceleration processing logic configured to perform the offload processing.

In Example 18, the subject matter of Example 17 includes, configuring an interface adapter of the first routing circuit to enumerate as an accelerator device to the host processor, based on the device capability information indicating the second routing circuit is configured to access the acceleration processing logic configured to perform the offload processing.

In Example 19, the subject matter of Example 18 includes, reserving bandwidth resources for the accelerator device, the bandwidth resources used for: the transmission of the first plurality of USB4 tunneled packets via the downstream tunneled path; and reception of the second plurality of USB4 tunneled packets via the upstream tunneled path.

In Example 20, the subject matter of Examples 13-19 includes subject matter where the device capability information indicates the second routing circuit is configured to access acceleration processing logic configured to perform the offload processing, wherein the acceleration processing logic includes acceleration memory, and the method further comprising: managing access to the acceleration memory of the acceleration processing logic using the downstream tunneled path.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels and are not intended to impose numerical requirements on their objects.

Although an aspect has been described with reference to specific exemplary aspects, it will be evident that various modifications and changes may be made to these aspects without departing from the broader scope of the present disclosure. Accordingly, the specification and drawings are to be regarded in an illustrative rather than a restrictive sense. This Detailed Description, therefore, is not to be taken in a limiting sense, and the scope of various aspects is defined only by the appended claims, along with the full range of equivalents to which such claims are entitled.

What is claimed is:

1. A Universal Serial Bus 4 (USB4) host system for offloading compute processing, the system comprising:
   a host processor; and
   a first routing circuit communicatively coupled to the host processor via an interface adapter, wherein the first routing circuit is to:
      decode device capability information, the device capability information received via a USB Type-C communication link from a second routing circuit, the device capability information indicating the second routing circuit is configured for offload processing;
      configure a downstream tunneled path between the host processor and the second routing circuit based on the device capability information, the downstream tunneled path including the USB Type-C communication link;
      packetize one or more acceleration commands and operands/data from the host processor into a first plurality of USB4 tunneled packets; and
      encode the first plurality of USB4 tunneled packets for transmission to the second routing circuit via the downstream tunneled path, to initiate the offload processing of the operands/data by the second routing circuit.

2. The USB4 host system of claim 1, wherein the first routing circuit is further to:
configure an upstream tunneled path between the host processor and the second routing circuit based on the device capability information, the upstream tunneled path including the USB Type-C communication link.

3. The USB4 host system of claim 2, wherein the first routing circuit is further to:
decode a second plurality of USB4 tunneled packets to obtain result data associated with the offload processing, the second plurality of USB4 tunneled packets received from the second routing circuit via the upstream tunneled path; and
communicate the result data to the host processor.

4. The USB4 host system of claim 3, wherein the result data is associated with application of the one or more acceleration commands to the operands/data during the offload processing.

5. The USB4 host system of claim 3, wherein the device capability information indicates the second routing circuit is configured to access acceleration processing logic configured to perform the offload processing.

6. The USB4 host system of claim 5, wherein the first routing circuit is further to:
configure the interface adapter to enumerate as an accelerator device to the host processor, based on the device capability information indicating the second routing circuit is configured to access the acceleration processing logic configured to perform the offload processing.

7. The USB4 host system of claim 6, wherein the host processor is to:
reserve bandwidth resources for the accelerator device, the bandwidth resources used for:
the transmission of the first plurality of USB4 tunneled packets via the downstream tunneled path; and
reception of the second plurality of USB4 tunneled packets via the upstream tunneled path.

8. The USB4 host system of claim 1, wherein the device capability information indicates the second routing circuit is configured to access acceleration processing logic configured to perform the offload processing, wherein the acceleration processing logic includes acceleration memory, and wherein the host processor is to:
manage access to the acceleration memory of the acceleration processing logic using the downstream tunneled path.

9. An accelerator device for offloading compute processing, the device comprising:
a Universal Serial Bus (USB) Type-C connector;
a first routing circuit communicatively coupled to the USB Type-C connector, the first routing circuit configured to:
encode device capability information for transmission via the USB Type-C connector to a second routing circuit of a host system, the device capability information indicating the first routing circuit is configured for offload processing; and
de-packetize a first plurality of USB4 tunneled packets to obtain one or more acceleration commands and operands/data originating from a host processor of the host system, the first plurality of USB4 tunneled packets received from the second routing circuit via a downstream tunneled path between the host processor and the first routing circuit, the downstream tunneled path including a USB Type-C communication link of the USB Type-C connector; and
an acceleration circuit communicatively coupled to the first routing circuit, the acceleration circuit configured to perform the offload processing using the one or more acceleration commands and operands/data to obtain result data.

10. The accelerator device of claim 9, wherein the first routing circuit is configured to:
encode a second plurality of USB4 tunneled packets with the result data for transmission to the second routing circuit via an upstream tunneled path.

11. The accelerator device of claim 10, wherein the upstream tunneled path is configured between the host processor and the first routing circuit based on configuration information received from the second routing circuit via the USB Type-C communication link.

12. The accelerator device of claim 9, wherein the acceleration circuit comprises acceleration processing logic and acceleration memory, wherein the acceleration processing logic is configured to perform the offload processing, and wherein the first routing device provides the host processor with access to the acceleration memory via the downstream tunneled path.

13. A method for offloading compute processing, the method comprising:
decoding by a first routing circuit of a Universal Serial Bus 4 (USB4) host system, device capability information received via a USB Type-C communication link from a second routing circuit, and the device capability information indicating the second routing circuit is configured for offload processing;
configuring a downstream tunneled path between a host processor of the USB4 host system and the second routing circuit based on the device capability information, the downstream tunneled path including the USB Type-C communication link;
packetizing one or more acceleration commands and operands/data from the host processor into a first plurality of USB4 tunneled packets; and
encoding the first plurality of USB4 tunneled packets for transmission to the second routing circuit via the downstream tunneled path, to initiate the offload processing of the operands/data by the second routing circuit.

14. The method of claim 13, further comprising:
configuring an upstream tunneled path between the host processor and the second routing circuit based on the device capability information, the upstream tunneled path including the USB Type-C communication link.

15. The method of claim 14, further comprising:
decoding a second plurality of USB4 tunneled packets to obtain result data associated with the offload processing, the second plurality of USB4 tunneled packets received from the second routing circuit via the upstream tunneled path; and
communicating the result data to the host processor.

16. The method of claim 15, wherein the result data is associated with application of the one or more acceleration commands to the operands/data during the offload processing.

17. The method of claim 15, wherein the device capability information indicates the second routing circuit is configured to access acceleration processing logic configured to perform the offload processing.

18. The method of claim 17, further comprising:
configuring an interface adapter of the first routing circuit to enumerate as an accelerator device to the host processor, based on the device capability information indicating the second routing circuit is configured to access the acceleration processing logic configured to perform the offload processing.

19. The method of claim 18, further comprising:

reserving bandwidth resources for the accelerator device, the bandwidth resources used for:

the transmission of the first plurality of USB4 tunneled packets via the downstream tunneled path; and reception of the second plurality of USB4 tunneled packets via the upstream tunneled path.

20. The method of claim 13, wherein the device capability information indicates the second routing circuit is configured to access acceleration processing logic configured to perform the offload processing, wherein the acceleration processing logic includes acceleration memory, and the method further comprising:

managing access to the acceleration memory of the acceleration processing logic using the downstream tunneled path.

* * * * *